(12) United States Patent
Hartley et al.

(10) Patent No.: US 11,541,380 B2
(45) Date of Patent: Jan. 3, 2023

(54) SUPERHYDROPHOBIC COATINGS FOR DEPOSIT REDUCTION IN SELECTIVE CATALYTIC REDUCTANT SYSTEMS

(71) Applicant: Southwest Research Institute, San Antonio, TX (US)

(72) Inventors: Ryan Hartley, Castroville, TX (US); Shekhar Vats, San Antonio, TX (US); Michael A. Miller, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 17/448,579

(22) Filed: Sep. 23, 2021

(65) Prior Publication Data

US 2022/0088581 A1    Mar. 24, 2022

Related U.S. Application Data

(60) Provisional application No. 62/706,997, filed on Sep. 23, 2020.

(51) Int. Cl.

| | | |
|---|---|---|
| *B01J 31/02* | (2006.01) | |
| *B01J 37/34* | (2006.01) | |
| *B01J 37/02* | (2006.01) | |
| *B01D 53/94* | (2006.01) | |
| *B05D 1/00* | (2006.01) | |
| *F01N 3/20* | (2006.01) | |
| *F01N 3/28* | (2006.01) | |

(52) U.S. Cl.
CPC ...... *B01J 31/0274* (2013.01); *B01D 53/9431* (2013.01); *B01J 31/0275* (2013.01); *B01J 37/0219* (2013.01); *B01J 37/349* (2013.01); *B05D 1/62* (2013.01); *F01N 3/2066* (2013.01); *F01N 3/2803* (2013.01); *F01N 3/2892* (2013.01); *F01N 2370/02* (2013.01); *F01N 2610/1453* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,038,853 | A * | 3/2000 | Penentrante | F01N 3/035 60/275 |
| 6,471,932 | B1 * | 10/2002 | Gieshoff | C01C 1/0494 204/157.43 |
| 6,557,340 | B1 * | 5/2003 | Twigg | B01D 53/32 60/275 |
| 9,701,869 | B2 | 7/2017 | Miller et al. | |
| 2003/0066285 | A1 * | 4/2003 | Raybone | B01D 53/9418 60/275 |
| 2008/0102010 | A1 * | 5/2008 | Bruck | F01N 3/0814 423/239.1 |

(Continued)

FOREIGN PATENT DOCUMENTS

| | | |
|---|---|---|
| CA | 2095938 | 11/1993 |
| DE | 102007056213 | 5/2009 |

(Continued)

*Primary Examiner* — Binh Q Tran
(74) *Attorney, Agent, or Firm* — Grossman, Tucker, Perreault & Pfleger, PLLC

(57) ABSTRACT

Superhydrophobic coatings to reduce deposit formation of diesel exhaust fluid (DEF) within selective catalytic reduction (SCR) systems.

19 Claims, 1 Drawing Sheet

(56) References Cited

U.S. PATENT DOCUMENTS

| | | | |
|---|---|---|---|
| 2008/0161182 A1* | 7/2008 | Jang | B01J 37/0201 |
| | | | 502/344 |
| 2015/0165434 A1* | 6/2015 | Yin | B01J 37/0228 |
| | | | 502/333 |
| 2018/0318763 A1* | 11/2018 | Biberger | B01D 53/9422 |

FOREIGN PATENT DOCUMENTS

| | | |
|---|---|---|
| WO | 2016053637 | 4/2016 |
| WO | 2018232293 | 12/2018 |
| WO | 2019117944 | 6/2019 |

* cited by examiner

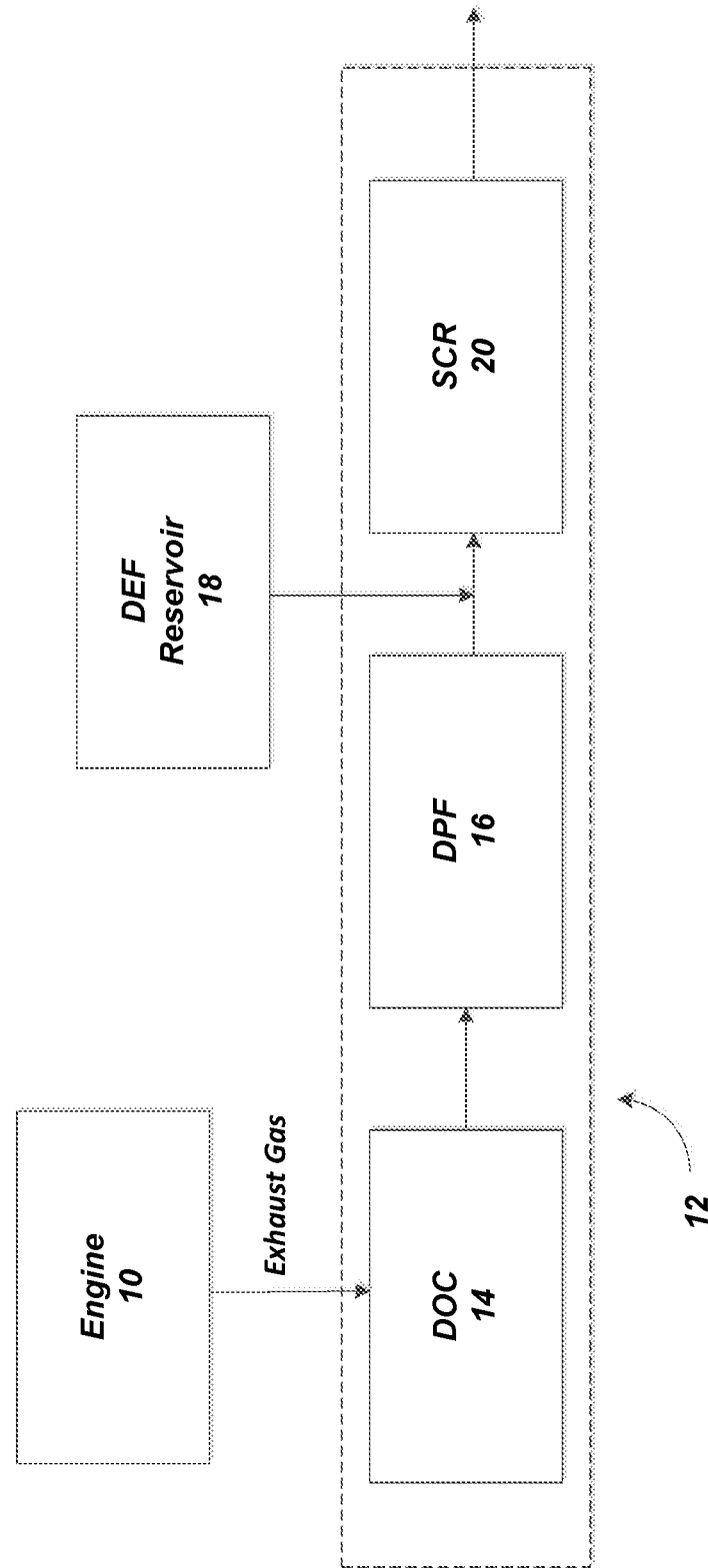

SUPERHYDROPHOBIC COATINGS FOR DEPOSIT REDUCTION IN SELECTIVE CATALYTIC REDUCTANT SYSTEMS

FIELD

The present invention is directed at superhydrophobic coatings to reduce deposit formation of diesel exhaust fluid (DEF) within selective catalytic reduction (SCR) systems.

BACKGROUND

Internal combustion engines such as those found in cars and trucks may produce combustion byproducts and/or products of incomplete combustion which may exist in the engine exhaust and emit into the environment. Per emissions regulations, the exhaust may be treated to reduce the concentration of such products and, therefore, reduce pollution. Although spark ignition (i.e., gasoline) engines may use three-way catalytic converters to satisfy emissions regulations, compression ignition (i.e., diesel) engines typically employ two-way catalytic converters which may not efficiently reduce nitrogen oxides (NOx). Accordingly, diesel engines may include selective catalytic reduction (SCR) systems in order to seek reduction in nitrogen oxide concentrations. Improving performance of such systems remains an ongoing area of research and development.

SUMMARY

A method for reducing deposits on the internal surface of SCR component(s) comprising:
providing a SCR component having an internal volume and internal surface and creating a vacuum within the interior volume of the SCR component;
supplying gas to the interior volume of said SCR component wherein the gas includes a plasma precursor in the gas phase;
biasing the SCR component to ground;
forming a plasma along the length of said SCR component;
generating positive ions of said plasma precursor which are deposited on the internal surface of said SCR component;
forming a coating on said internal surface of said SCR component wherein said coating exhibits a water contact angle in oil of greater than 120°.

A coated SCR component comprising:
a SCR component having an internal surface configured to be exposed to diesel emission fluid;
a carbo-siloxane coating disposed on said SCR component internal surface, wherein said coating has a water contact angle of greater than 120°, wherein said coating comprises 50 to 60 atomic percent carbon, 20 to 30 atomic percent oxygen, and 15 to 25 atomic percent silicon, wherein said coating, at a depth of up to 300 Angstrom, comprises: (a) Si—O— at a relative concentration of 38.5(±12) %; (b) Si—C at a relative concentration of 25.6 (±5) %; (c) C—O at a relative concentration of 4.5 (±3) %; and (d) C—C at a relative concentration of 31.4 (±2) %.

BRIEF DESCRIPTION OF THE DRAWINGS

FIG. 1 is a block diagram overview of a compression ignition engine that includes a SCR system.

DETAILED DESCRIPTION

Attention is directed to FIG. 1, which provides in block diagram form an overview of a compression ignition engine 10, such as a diesel engine, outputting exhaust gas to an exhaust after-treatment system 12 which may include a diesel oxidation catalyst (DOC) chamber 14 which connects to a diesel particulate filter (DPF) 16 which then feeds the selective catalyst reduction (SCR) system 20. The DOC 14 can serve to convert NO to $NO_2$ and remove hydrocarbons (HC) according to the following general reactions:

$$2NO+O_2 \rightarrow 2NO_2$$

$$2CO+O_2 \rightarrow 2CO_2$$

$$4HC+5O_2 \rightarrow 4CO_2+2H_2O$$

A diesel emission fluid (DEF) reservoir is provided at 18 which contains an aqueous based urea solution. Preferably aqueous urea based solutions that are employed typically include those having 30.0 wt. % to 40.0 wt. % urea, and preferably 32.5 wt. % urea. Urea is used as a convenient source of ammonia ($NH_3$) reductant in SCR systems for decreasing NOx emissions from diesel engines. Urea ($H_2NCONH_2$) is therefore a component of what is termed a diesel emission fluid (DEF) that is preferably introduced as a spray into the exhaust gases upstream of the SCR catalyst. The DEF vaporizes and the urea thermally decomposes into $NH_3$ as illustrated below:

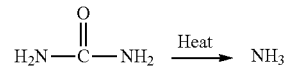

The ammonia as formed above may then be utilized as the reductant in selective catalytic reduction (SCR) to reduce NOx to nitrogen and water. Such reactions include the following:

$$4NH_3+4NO+O_2 \rightarrow 4N_2+6H_2O$$

$$2N_3+NO+NO_2 \rightarrow 2N_2+3H_2O$$

$$8NH_3+6NO_2 \rightarrow 7N_2+12H_2O$$

However, as between the DEF reservoir 18 and SCR system 20 containing an SCR catalyst, there are typically one or more SCR components with internal surfaces that will come into contact with the DEF or aqueous based urea solution before the urea is introduced to the SCR catalyst in SCR system 20. Reference to one or more SCR components herein may be understood by the term "SCR component(s)." Such SCR component(s) include, but are not limited to metallic components, such as exhaust tubing, mixers, metering pumps, as well as DEF injectors. Accordingly, any component that is positioned as between the DEF reservoir 18 and SCR system 20 having an internal surface, that will be exposed to the aqueous based urea solution, should be understood herein as the SCR component. The contact of the internal surfaces of the SCR component(s) with the DEF may then result in cooling of any such internal surface where urea is then deposited. Such deposited urea may then accumulate in solid form and can also convert into an insoluble deposit with a variety of undesirable consequences.

For example, the above-referenced deposit formation is contemplated to result in, among other things, reduced NOx conversion, clogged DEF injectors, maldistribution of the exhaust flow, and system backpressure. In addition, urea deposit formation may also result in ammonia-slip which is reference to the feature that excess ammonia is present in the final exhaust from the SCR process. Without being bound by any theory, it is believed that the deposit formation of urea on one or more of the SCR component(s) may be due to the failure of the water portion of the DEF spray to fully evaporate before impinging on the internal surfaces of the SCR system which is then accompanied by a cooling of such internal surfaces. As such internal surfaces of the SCR component(s) cool by accumulation of fluid, the rate of water evaporation may be further depressed and the deposit mass then increased. Accordingly, a substantial reduction or elimination of deposit formation may be achieved by preventing the pooling of DEF on the internal surfaces that are exposed to DEF between the DEF reservoir and the SCR systems.

The coatings herein may be preferably applied by creating a vacuum within an interior volume of the SCR component(s) whose internal surface is to be coated, wherein the SCR component(s) includes an internal surface and interior volume. Gas is supplied to the interior volume of the SCR component(s), wherein the gas includes a plasma precursor in the gas phase. The SCR component(s) is preferably biased relative to ground. Plasma is formed that may preferably be cyclically positioned along the length of the SCR component(s). Positive ions of the plasma precursor gas are generated and then may be accelerated to the internal surface and deposited on the internal surface of the SCR component(s) forming a coating, wherein the coating exhibits a water contact angle of greater than 120°.

In a related aspect, the present disclosure relates to a conformal coating disposed on the internal surface of one or more SCR components wherein the coating has a water contact angle of greater than 120°. The coating preferably comprises 50 to 60 atomic percent carbon, 20 to 30 atomic percent oxygen, and 15 to 25 atomic percent silicon. The coating, at a depth of up to 300 Angstroms, preferably includes the following chemical bond types: (a) Si—O- at a relative concentration of 38.5(±12) %;(b) Si—C at a relative concentration of 25.6 (±5) %; (c) C—O at a relative concentration of 4.5 (±3) %; and (d) C—C at a relative concentration of 31.4 (±2) %.

The coatings may include, consist essentially of, or consist of 50 to 60 atomic percent carbon, including all values and ranges therein, 20 to 30 atomic percent oxygen, including all values and ranges therein, and 15 to 25 atomic percent silicon, including all values and ranges therein. The elements are present at a total amount of 100 atomic percent; however, impurities may be present up to 1 atomic percent of the total composition. Preferably, the coatings may be composed of 56 to 57 atomic percent carbon, including all values and ranges therein, 20 to 26 atomic percent oxygen, including all values and ranges therein, and 17 to 23 atomic percent silicon, including all values and ranges therein. In addition, such atomic percent concentrations and the aforementioned bond types are such that they are present at the surface and at depths of 100 Angstroms, 200 Angstroms and 300 Angstroms into the coating. Thus, the indicated atomic percent concentration of C, O and Si is present in a relatively uniform profile from the surface to a depth of 300 angstroms.

The coatings herein may be preferably formed from silane compounds providing C, H, O and Si. Preferably a plasma precursor may include hexamethyldisiloxane (HMDSO) having the formula $(CH_3)_3Si—O—Si(CH_3)_3$. It can be appreciated that the precursors so identified may then form a plasma by themselves or with the assistance of a noble gas such as Ar (preferably) or He, and coat the internal surfaces of the SCR component to provide the amorphous domains noted above. Additionally, other preferred precursors useful in forming superhydrophobic coatings on the internal surface of the SCR components herein, in accordance with the process methods described herein, include: (1) hexamethyldisilazane $(CH_3)_3Si—N—Si(CH_3)_3$; (2) bis-trifluoropropyl tetramethyldisiloxane $(CF_3C_2H_4)$ $Si(CH_3)_2—O—Si(CH_3)_2$ $(CF_3C_2H_4)$; and (3) combinations of HMDSO or (1) or (2) with a volatile fluorocarbon including, but not limited to, perfluoropropane $(C_3F_8)$, hexafluoropropylene oxide $(C_3F_6O)$, perfluorocyclohexane $(C_6F_{12})$, and hexafluorobenzene $(C_6F_6)$. The coatings herein may preferably be applied via the procedures identified in U.S. Pat. No. 9,201,540, whose teachings are incorporated by reference.

In addition, the coatings herein on the internal surface of the SCR component(s) may also preferably comprise a fluoro-organosiloxane coating. Such coating may therefore preferably be applied by providing a process chamber including one or more SCR components having internal surface(s) and an electrode positioned in said SCR component, reducing pressure in said process chamber to a first pressure in the range of 10 mTorr to 40 mTorr, introducing a substituted tetramethylenedisiloxane (sTMDSO) precursor:

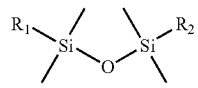

wherein $R_1$ and/or $R_2$ are selected from a carbon-hydrogen alkyl group wherein one or more of the carbon-hydrogen atoms in the alkyl group may be replaced by a carbon-fluorine linkage and wherein said sTMDSO precursor is introduced at a flow rate $(Q_{sTMDSO})$. This may then be followed by introducing a perfluorinated propylene oxide (PFPO)

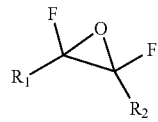

wherein $R_1$ and/or $R_2$ may a F atom or a perfluorinated alkyl group wherein said perfluorinated propylene oxide precursor is introduced at a flow rate $(Q_{PFPO})$ and setting a flow rate ratio $(Q_{sTMDSO}/Q_{PFPO})$ in the range of 0.1 to 2.0 (g/(hr·sccm)). One may then apply a pulsed DC voltage to said SCR component and deposit a fluoro-organosiloxane coating on the internal surfaces of said SCR compnent. The fluoro-organosiloxane coating so formed exhibits a water contact angle in oil (WCA/O) of greater than 155 °. Preferably, the WCA/O may fall in the range of greater than 155° to 170°. Reference is also made to U.S. Publ. 2017/0321326A1, whose teachings are incorporated by reference.

The resulting coating compositions are characterized by having a water contact angle (WCA) of a liquid-water drop resting on the surface of a coated steel substrate immersed in mineral oil. The WCA is determined to exceed 120° and can reach a value of 170°, including all values and ranges therein. As surface roughness increases, the water contact angle increases. The contact angle is determined by the angle θ formed between the surface plane of the coated substrate, parallel with the solid-water interface, and the tangent line at the water-oil interface intersecting the surface plane at the solid-water-oil triple point, measured through the water drop, wherein the oil is mineral oil. Measurement of the water contact angle may be achieved by methods conventionally practiced, which include, for example, a goniometer coupled with a relatively high resolution camera.

The thickness of the coating compositions formed on the internal surface of the SCR component(s) may be up to 5.0 μm, or in the range of 0.1 μm to 5.0 μm. The coating composition may also have a thickness in the range of 0.1 μm to 4.5 μm or 0.1 μm to 4.0 μm, 0.1 μm to 3.5 μm, 0.1 μm to 3.0 μm. 0.1 μm to 2.5 μm, 0.1 μm to 2.0 μm, 0.1 μm to 1.5 μm, 0.1 μm to 1.0 μm or 0.1 μm to 0.5 μm.

It may therefore be appreciated herein that via use of the coatings described herein, on the internal surface of an SCR component(s) (i.e. any component positioned between the SCR reservoir and the SCR catalyst system that is exposed to DEF), deposit formation on such internal surfaces may be reduced or avoided. In particular, the coatings herein are useful to reduce or limit deposition formation on the internal surface of the SCR component(s) when the SCR catalytic system is being operated at: (1) relatively low temperature (≤250° C.); (2) and/or relatively low space velocity (SV) through the SCR catalyst (i.e. less than or equal to 50,000 hr$^{-1}$). The space velocity through the SCR catalyst system is defined as the volumetric flow rate of the exhaust stream in liter/hour divided by the volume of the SCR reactor in liters containing the SCR catalyst:

$$\text{Space Velocity} = \frac{\text{Exhaust Flow}\left(\frac{\text{liters}}{\text{hour}}\right)}{\text{SCR Reactor Volume (liters)}}$$

It may also be appreciated that the coated internal surfaces of the SCR component(s) are contemplated to have a reduced temperature drop upon initiation of the DEF injection compared to unmodified internal surfaces. This is contemplated to again reduce the extent of DEF pooling and accumulation of deposits in problematic regions of the SCR aftertreatment system. In addition, because of the reduced DEF deposit formation, as alluded herein, DEF injection itself may be permitted at relatively lower temperatures ((<250° C.) compared to SCR systems that do not have the coatings herein. More preferably, DEF injection is contemplated to be permitted at temperatures of 160° C. to 200° C. The then is contemplated to provide overall improved NOx conversion and performance of any SCR exhaust after-treatment apparatus.

While particular embodiments have been described, it should be understood that various changes, adaptions and modifications may be made without departing from the present invention. The foregoing is therefore not intended to limit the claims to the precise steps and or components disclosed.

The invention claimed is:

1. A method for reducing deposits on the internal surface of SCR component(s) comprising:
    providing an SCR component having an internal volume and internal surface and creating a vacuum within the interior volume of the SCR component;
    supplying gas to the interior volume of said SCR component wherein the gas includes a plasma precursor in the gas phase;
    biasing the SCR component to ground;
    forming a plasma along the length of said SCR component;
    generating positive ions of said plasma precursor which are deposited on the internal surface of said SCR component;
    forming a coating on said internal surface of said SCR component wherein said coating exhibits a water contact angle in oil of greater than 120°.

2. The method of claim 1, wherein said plasma precursor comprises hexamethyldisiloxane.

3. The method of claim 1 wherein said plasma precursor comprises a perfluorinated propylene oxide.

4. The method of claim 1 wherein said plasma precursor comprises a substituted tetramethylenedisiloxane (sTMDSO) precursor:

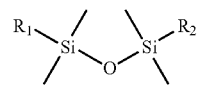

wherein $R_1$ and/or $R_2$ are selected from a carbon-hydrogen alkyl group wherein one or more of the carbon-hydrogen atoms in the alkyl group may be replaced by a carbon-fluorine linkage and wherein said sTMDSO precursor is introduced at a flow rate ($Q_{sTMDSO}$); and a perfluorinated propylene oxide (PFPO) precursor:

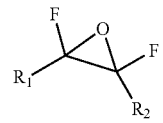

wherein $R_1$ and/or $R_2$ may a F atom or a perfluorinated alkyl group wherein said perfluorinated propylene oxide precursor is introduced at a flow rate ($Q_{PFPO}$) and setting a flow rate ratio ($Q_{sTMDSO}/Q_{PFPO}$) in the range of 0.1 to 2.0 (g/(hr·sccm)).

5. The method of claim 1, wherein said coating comprises 50 to 60 atomic percent carbon, 20 to 30 atomic percent oxygen and 15 to 25 atomic percent silicon.

6. The method of claim 1, wherein said coating, at a depth of up to 300 Angstroms, comprises the following bond types:
    (a) Si—O— at a relative concentration of 38.5(±12) %;
    (b) Si—C at a relative concentration of 25.6 (±5) %;
    (c) C—O at a relative concentration of 4.5 (±3) %; and
    (d) C—C at a relative concentration of 31.4 (±2) %.

7. The method of claim 1, wherein said coating has a thickness of up to 5.0 μm.

8. The method of claim 1, wherein said coating has a water contact angle in oil of greater than 120° to 170°.

9. The method of claim 1, wherein said coating has a water contact angle in oil of greater than 155°.

10. The method of claim 1 wherein said coating comprises a fluoro-organsiloxane coating.

11. The method of claim 1, wherein said SCR component comprises metallic tubing.

12. The method of claim 1, wherein said SCR component comprises a mixer.

13. The method of claim 1, wherein said SCR component comprises a DEF injector.

14. A coated SCR component comprising:
    a SCR component having an internal surface configured to be exposed to diesel emission fluid;

a carbo-siloxane coating disposed on said SCR component internal surface, wherein said coating has a water contact angle of greater than 120°, wherein said coating comprises 50 to 60 atomic percent carbon, 20 to 30 atomic percent oxygen, and 15 to 25 atomic percent silicon, wherein said coating, at a depth of up to 300 Angstrom, comprises: (a) Si—O— at a relative concentration of 38.5(±12) %; (b) Si—C at a relative concentration of 25.6 (±5) %; (c) C—O at a relative concentration of 4.5 (±3) %; and (d) C—C at a relative concentration of 31.4 (±2) %.

15. The coated SCR component of claim 14, wherein said coating ha a water contact angel in oil of greater than 120° to 170°.

16. The coated SCR component of claim 14, wherein said coating is present at a thickness of up to 5.0 µm.

17. The coated SCR component of claim 14, wherein said coating comprises 56 to 57 atomic percent carbon, 20 to 26 atomic percent oxygen, 17 to 23 atomic percent silicon.

18. The coated SCR component of claim 14, wherein said coating is present at a depth of up to 200 Angstroms.

19. The coating SCR component of claim 14, wherein said coating is present at a depth of up to 100 Angstroms.

\* \* \* \* \*